United States Patent
Anabuki et al.

(10) Patent No.: US 6,633,304 B2
(45) Date of Patent: Oct. 14, 2003

(54) MIXED REALITY PRESENTATION APPARATUS AND CONTROL METHOD THEREOF

(75) Inventors: Mahoro Anabuki, Kanagawa (JP); Kiyohide Satoh, Kanagawa (JP); Akihiro Katayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 326 days.

(21) Appl. No.: 09/816,072

(22) Filed: Mar. 26, 2001

(65) Prior Publication Data

US 2002/0057280 A1 May 16, 2002

(30) Foreign Application Priority Data

Nov. 24, 2000 (JP) ........................................ 2000-358002

(51) Int. Cl.[7] .............................................. G06T 15/20
(52) U.S. Cl. ..................................................... 345/633
(58) Field of Search ........................ 345/113–116, 118, 345/633

(56) References Cited

U.S. PATENT DOCUMENTS

| | | | | | |
|---|---|---|---|---|---|
| 5,884,223 | A | * | 3/1999 | Tognazzini | ................. 701/301 |
| 5,926,216 | A | * | 7/1999 | Nobuoka | .................... 348/297 |
| 2003/0032484 | A1 | * | 2/2003 | Ohshima et al. | .............. 463/43 |

FOREIGN PATENT DOCUMENTS

| | | | | |
|---|---|---|---|---|
| JP | 02-054297 | * | 2/1990 | ............ G09G/5/02 |
| JP | 5-233826 | | 9/1993 | |
| JP | 8-063618 | | 3/1996 | |
| JP | 09-275487 | | 10/1997 | |
| JP | 9-319896 | | 12/1997 | |
| JP | 11-167449 | | 6/1999 | |
| JP | 2000-113215 | | 4/2000 | |
| JP | 2000-200299 | | 7/2000 | |
| JP | 2000-315261 | | 11/2000 | |

OTHER PUBLICATIONS

"Rendering Synthetic Objects into Real Scenes: Bridging Traditional and Image–Based Graphics with Global Illumination and High Dynamic Range Photography," Debevec, Proceedings of the 25th Annual Conference on Computer Graphics and Interactive Techniques, ACM Press, 1998, pp. 189–198.

Steven Feiner, et al. "A Touring Machine: Prototyping 3D Mobile Augmented Reality Systems for Exploring the Urban Environment", Personal Technologies, vol. 1, No. 4, pp. 208–217 (1997).

* cited by examiner

Primary Examiner—Matthew C. Bella
Assistant Examiner—G. F. Cunningham
(74) Attorney, Agent, or Firm—Fitzpatrick, Cella, Harper & Scinto (57) ABSTRACT

A mixed reality presentation apparatus and control method thereof which can allow for suitable display of a virtual object depending on tone, brightness, and lighting conditions of a physical space on which the virtual object is superimposed and displayed is disclosed. The mixed reality presentation apparatus according to the present invention includes: a display setting adjustor 106 which adjusts the display colors and position of virtual information and the lighting settings based on the tone of the physical space which the observer sees and it determines the display colors such that a large tone difference from the physical space image is achieved for virtual text information and virtual wire frame information as well as the lighting settings used for drawing a three-dimensional virtual object with a tone such that it is merged with an object existing in the physical space.

11 Claims, 7 Drawing Sheets

MIXED REALITY PRESENTATION APPARATUS AND CONTROL METHOD THEREOF

FIELD OF THE INVENTION

The present invention relates to a mixed reality presentation apparatus and control method thereof, and in particular, to a mixed reality presentation apparatus and control method thereof which can allow for presentation of a mixed reality by superimposing a virtual space image on a physical space where tone and brightness may vary largely.

BACKGROUND OF THE INVENTION

Recently, some systems or man-machine interfaces which use a mixed reality (MR) have been proposed. The MR is a technology for presenting a merged image of a virtual space generated by a computer and the physical space visually identified by an observer or taken in proximity to the observer's viewpoint to mutually complement and augment the information on both spaces.

Among these systems which use the MR (MR systems), attention is focused on a system which superimposes and displays texts as virtual objects, additional information such as wire frames, and computer graphics (CG) objects on the physical space and this system is applied to information presentation to the observer or visual simulation.

Researches have been made to implement such an MR system outdoors and one of them is disclosed in a publication entitled "A Touring Machine: Prototyping 3D Mobile Augmented Reality Systems for Exploring the Urban Environment" by Steven Feiner, Blair MacIntre, Tobias Hollerer, and Anthony Webster, Personal Technologies, vol. 1, no. 4, pp. 208–217, 1997.

The MR system disclosed in this publication is a system for guiding the observer throughout the premise of a university and displays on a head mounted display (HMD) of optical see-through type worn by the observer some guide information (such as campus names) generated based on the observer's viewpoint position and orientation acquired through a global positioning system (GPS), a inclinometer, and a magnetometer. Thus, the observer can visually identify, for example, a campus existing on the physical space and a campus name displayed on the display in proper alignment therewith simultaneously and can receive the guide information in real time while walking through the premise.

However, when the MR system is used outdoors, the environmental conditions are largely different from those for indoor use and vary to a larger extent, which may create unique problems. Namely, since the outdoor environment is generally brighter than the indoor environment, it may be difficult for the observer to visually identify virtual objects, in particular, fine-line objects such as text information or wire frame information if the tone difference between these objects and the background real object is small.

In addition, as the observer moves, the tone, brightness, and lighting conditions of the physical space visually identified by the observer will vary within a very large range and thus, it is difficult to previously determine display colors such that the tone difference may be sufficiently large. Moreover, even if the observer does not move, the tone, brightness, and lighting conditions of the physical space may vary depending on date and time as well as weather conditions, which will create the same problems.

Similarly, when a CG object such as a sufficiently wide building is displayed as if it exists in the physical space, the virtual CG object cannot be merged into the physical space to make the observer feel disharmony if the MR system is used outdoors and the tone difference between the object and the background physical space is very large.

The problem that the visibility of the virtual object is deteriorated to make the observer feel disharmony depending on the tone and brightness of the physical space is very remarkable especially when the MR system is used outdoors but that problem may be caused by some change in lighting conditions, for example, due to the influence of sunlight even when the MR system is used indoors.

SUMMARY OF THE INVENTION

The present invention has been achieved in light of the above-mentioned disadvantages of the prior art and it is an object of the present invention to provide a mixed reality presentation apparatus and control method thereof which can allow for suitable display of a virtual object depending on the tone, brightness, and lighting conditions of the physical space on which the virtual object is superimposed and displayed.

According to an aspect of the present invention, a mixed reality presentation apparatus for presenting a mixed reality to an observer by superimposing a virtual space image composed of a virtual object image on a physical space or an image thereof visually identified by the observer and presenting the virtual space image to the observer is provided, wherein the apparatus includes: tone detection means for detecting a tone of a predetermined region in the physical space or the image thereof; tone determination means for determining the tone of the virtual object image based on detection results from the tone detection means and the type of the virtual object image to be superimposed and displayed or the purpose of the display thereof; virtual space image generation means for generating the virtual space image composed of the virtual object image based on the determination results from the tone determination means; and presentation means for presenting the virtual space image generated by the virtual space image generation means to the observer by superimposing the virtual space image on the physical space or the image thereof.

According to another aspect of the present invention, a control method of a mixed reality presentation apparatus for presenting a mixed reality to an observer by superimposing a virtual space image composed of a virtual object image on the physical space or an image thereof visually identified by the observer and presenting the virtual space image to the observer is provided, wherein the method includes: a tone detection step of detecting the tone of a predetermined region in the physical space or the image thereof; a tone determination step of determining the tone of the virtual object image based on the detection results from the tone detection step and the type of the virtual object image to be superimposed and displayed or the purpose of the display thereof; a virtual space image generation step of generating the virtual space image composed of the virtual object image based on the determination results from the tone determination step; and a presentation step of presenting the virtual space image generated by the virtual space image generation step to the observer by superimposing the virtual space image on the physical space or the image thereof.

According to still another aspect of the present invention, a computer-readable storage medium storing a control program for a mixed reality presentation apparatus for presenting a mixed reality to an observer by superimposing a virtual space image composed of a virtual object image on the physical space or an image thereof visually identified by the observer and presenting the virtual space image to the observer is provided, wherein the program includes: a tone detection process program for detecting the tone of a predetermined region in the physical space or the image thereof; a tone determination process program for determining the tone of the virtual object image based on the detection results from the tone detection process program and the type of the virtual object image to be superimposed and displayed or the purpose of the display thereof; a virtual space image generation process program for generating the virtual space image composed of the virtual object image based on the determination results from the tone determination process program; and a presentation process program for presenting the virtual space image generated by the virtual space image generation process program to the observer by superimposing the virtual space image on the physical space or the image thereof.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
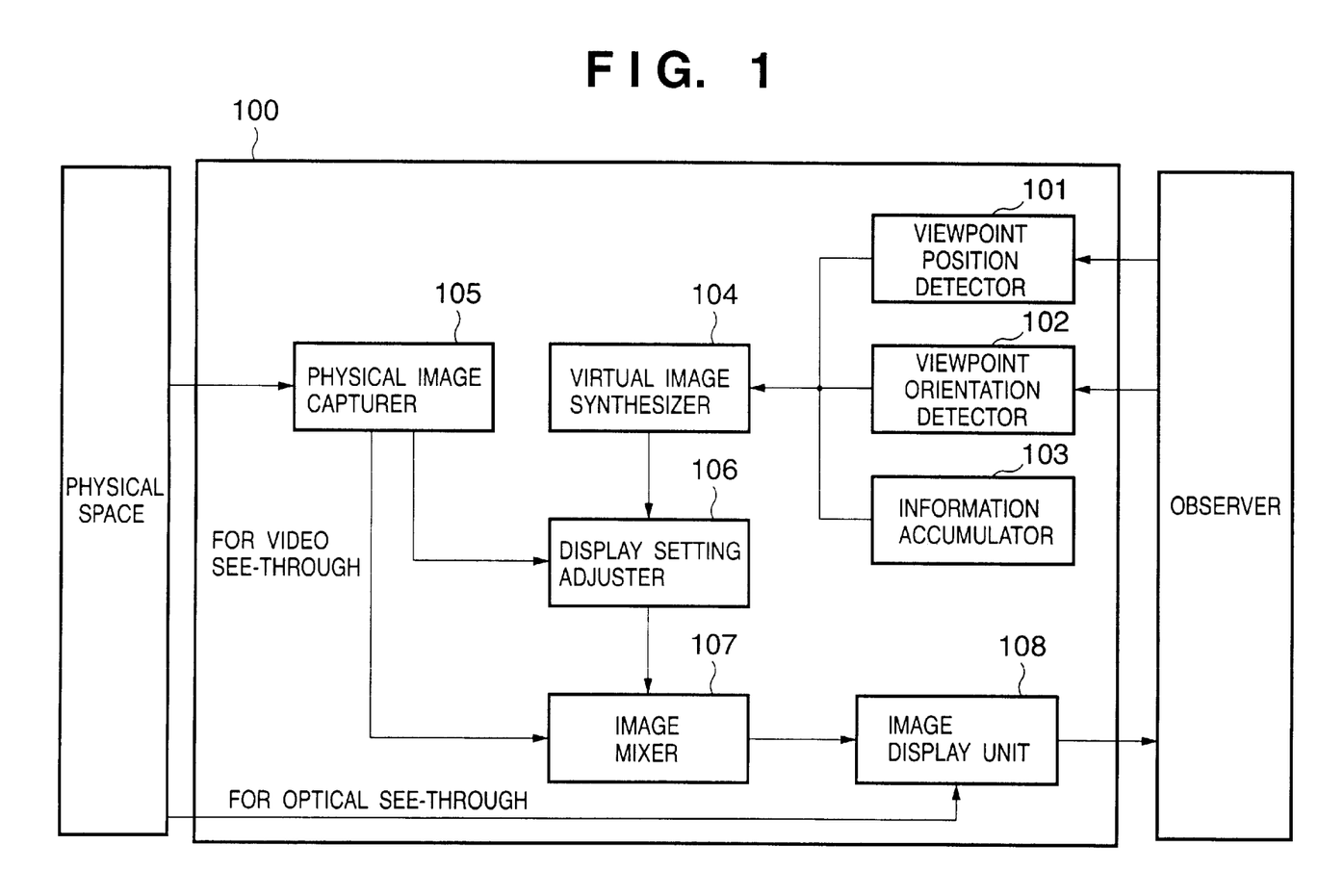
FIG. 1 is a block diagram for showing an overall configuration of a mixed reality presentation apparatus according to an embodiment of the present invention.

FIG. 1 is a block diagram for showing an overall configuration of a mixed reality presentation apparatus according to an embodiment of the present invention. In FIG. 1, a mixed reality presentation apparatus 100 comprises a viewpoint position detector 101 which detects an observer's viewpoint position, a viewpoint orientation detector 102 which detects the observer's viewpoint orientation, an information accumulator 103 which accumulates necessary information for generating a virtual space, a virtual image synthesizer 104 which receives an observer's viewpoint position from the above viewpoint position detector 101, the observer's viewpoint orientation from the above viewpoint orientation detector 102, and necessary information for generating the virtual space from the above information accumulator 103 and generates a virtual space image composed of a virtual object image, a physical image capturer 105 which captures an image of the real world which the observer sees, a display setting adjustor 106 which adjusts the display colors and position of the virtual object image and the lighting settings based on the virtual space image generated by the virtual image synthesizer 104 and the physical image captured by the physical image capturer 105, an image mixer 107 which draws the virtual space image and combines the virtual space image with the physical image, and an image display unit 108 which presents the image drawn or combined by the image mixer 107 to the observer.

In FIG. 1, the image display unit 108 has the configuration which can accommodate both HMD types of video see-through (wherein a virtual space and the physical space are merged in the apparatus) and optical see-through (wherein an image generated by the apparatus and an image of the physical space are merged on the observer's retinae) but the unit may have another configuration which can accommodate only one of the two types.

In FIG. 1, the virtual image synthesizer 104, the display setting adjustor 106, and the image mixer 107 may be implemented in dedicated hardware or by a general-purpose microprocessor running the program therefor. The observer's viewpoint position and orientation may be detected by a single detector (sensor).

Figure 2:
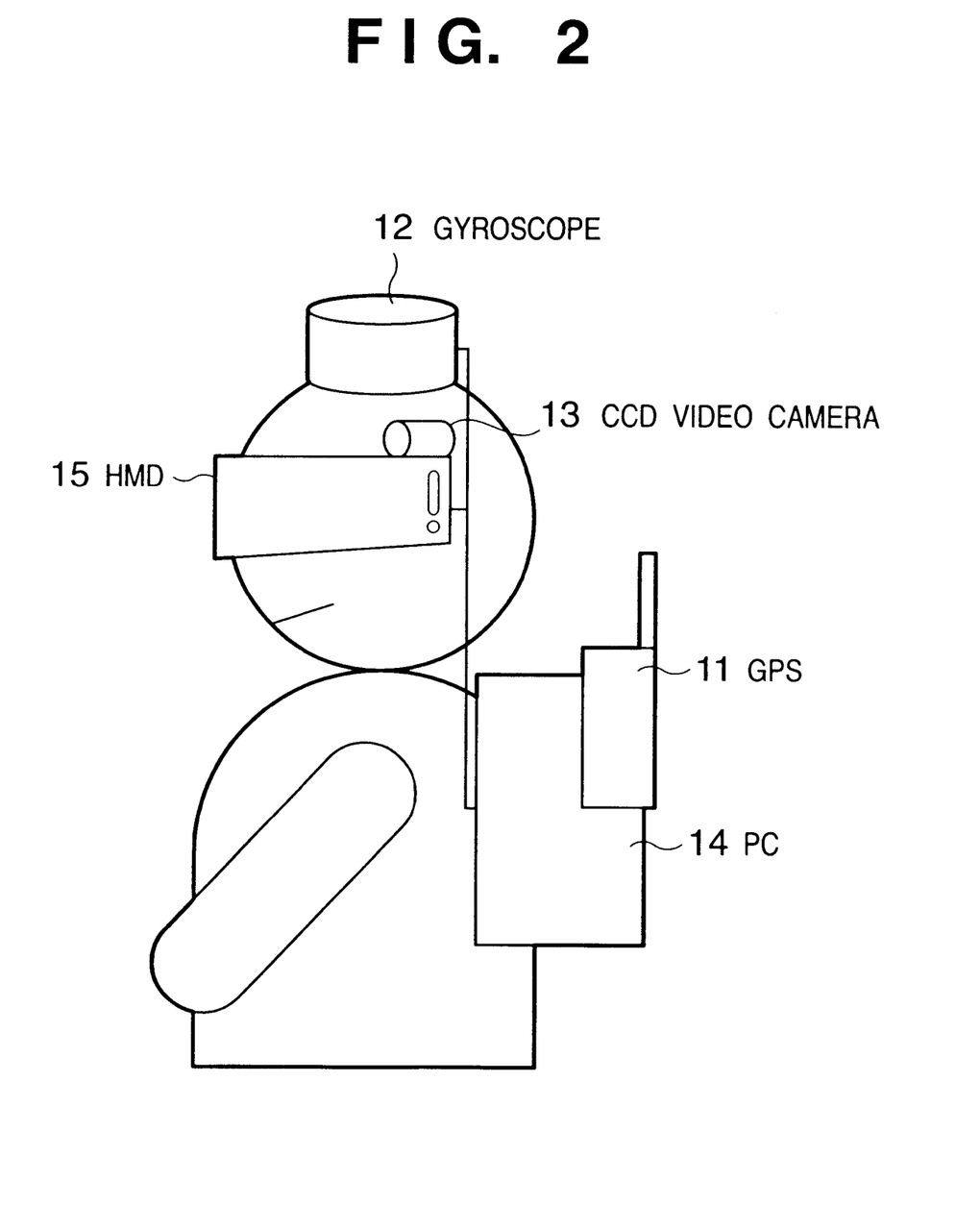
FIG. 2 shows an example wherein an observer wears the mixed reality presentation apparatus shown in FIG. 1.

FIG. 2 shows a specific example wherein the mixed reality presentation apparatus 100 according to this embodiment shown in FIG. 1 is implemented outdoors.

Namely, a GPS 11 is used as the viewpoint position detector 101 which detects the observer's viewpoint position, a gyroscope 12 is used as the viewpoint orientation detector 102 which detects the observer's viewpoint orientation, a CCD video camera 13 is used as the physical image capturer 105 which captures an image of the real world which the observer sees, an HMD 15 is used as the image display unit 108, and a personal computer (PC) 14 is used as the information accumulator 103, the virtual image synthesizer 104, the display setting adjustor 106, and the image mixer 107. If the virtual image synthesizer 104, the display setting adjustor 106, and the image mixer 107 are wholly or partly implemented in hardware, a board with that hardware mounted thereon is inserted into a bus such as a PCI bus of the PC 14. In addition, the information accumulator 103 may be implemented by any storage device used for a computer such as a hard disk or CD-ROM.

Of course, the GPS 11 and the gyroscope 12 may be substituted by other sensors or devices which have similar functions and their positions are not limited to those in FIG. 2.

Returning to FIG. 1, the viewpoint position detector 101 has a position measuring sensor or device (position measuring equipment) such as a magnetic sensor or GPS. Since such position measuring equipment cannot be installed at the observer's viewpoint, the output of the position measuring equipment does not correspond to the observer's viewpoint position. Therefore, the viewpoint position detector 101 provides an output to the virtual image synthesizer 104 after the observer's viewpoint position is calculated by compensating the output of the position measuring equipment.

For example, when the GPS 11 serving as the position measuring equipment is fixed at a distance from the observer as shown in FIG. 2, the position relationship between the position measuring equipment and the observer's viewpoint is kept approximately constant and thus, the observer's viewpoint position can be calculated by applying a predefined transformation expression to the result output from the position measuring equipment. Of course, when the GPS 11 is fixed on the observer's back as shown in FIG. 2, it cannot follow the movement of the observer's head with some error but the range of head movement is not so large as to create some problem. However, it should be appreciated that the viewpoint position can be calculated more accurately if it is fixed on the observer's head like the gyroscope 12 in FIG. 2.

Alternatively, the result output from the position measuring equipment may be further compensated by detecting the position of a landmark (an object or its discriminating point having a known absolute position) within an image of the physical image taken by the capturer 105.

That is, the position of the landmark which exists in the physical space is recognized on the captured image and then the output from the position measuring equipment is compensated so that there is no difference between the position on the captured image and the position calculated from the result output of the position measuring equipment. The observer's viewpoint position may be calculated through such image processing only. The apparatus may comprise any other mechanism which can acquire the observer's viewpoint position.

The viewpoint orientation detector 102 has an orientation measuring sensor or device (orientation measuring equipment) such as a magnetometer or gyroscope. Since such orientation measuring equipment cannot be installed at the observer's viewpoint like the position measuring equipment, the output of the orientation measuring equipment does not correspond to the observer's viewpoint orientation. Therefore, the viewpoint orientation detector 102 provides an output to the virtual image synthesizer 104 after the observer's viewpoint orientation is calculated by compensating the output of the orientation measuring equipment.

For example, when the gyroscope 12 serving as the orientation measuring equipment is fixed on the observer's head as shown in FIG. 2, the orientation relationship between the orientation measuring equipment and the observer's viewpoint is kept constant and thus, the observer's viewpoint orientation can be calculated by applying a predefined transformation expression to the result output from the orientation measuring equipment.

Alternatively, the result output from the orientation measuring equipment may be further compensated by detecting the position of a landmark (an object or its discriminating point having a known absolute position) within an image of the physical image taken by the capturer 105.

That is, the position of the landmark which exists in the physical space is recognized on the captured image and then the output from the orientation measuring equipment is compensated so that there is no difference between the position on the captured image and the position calculated from the result output of the orientation measuring equipment. The observer's viewpoint orientation may be calculated through such image processing only. The apparatus may comprise any other mechanism which can acquire the observer's viewpoint orientation.

The information accumulator 103 is a storage device or medium such as a hard disk or CD-ROM as described above and it stores virtual information necessary for constructing a virtual space, real information necessary for correctly merging the virtual space and the physical space, and image information necessary for generating a virtual space image.

The virtual information includes character information for a text to be presented to the observer, line type information for wire frames to emphasize the contour of an object which exists within the observer's sight, and information on the position, orientation, and shape of a virtual object to be located in the virtual space.

The real information includes information on the position, orientation, and shape of an object (real object) which exists in the physical space to be merged with the virtual space. The image information includes camera parameters such as field of view and focal length of the image display unit 108 which are necessary for superimposing and displaying the virtual space image in alignment with the physical space visually identified by the observer.

Such information is not limited to fixed information as described above and, for example, the real information may be changed in real time based on the physical space image captured by the physical image capturer 105. It is needless to say that the information accumulator 103 is implemented with a rewritable storage device or medium, when the information stored in the information accumulator is to be rewritten in this way.

The virtual image synthesizer 104 is implemented by a general-purpose microprocessor running the program therefor or in dedicated hardware as described above. Of course, only some processes of the virtual image synthesizer 104 may be implemented in dedicated hardware and the other processes may be implemented in software.

The virtual image synthesizer 104 uses the virtual information and the real information stored in the information accumulator 103 to construct a virtual space. Then, a real object is represented as a transparent CG in the virtual space so that the hiding relationship between the virtual space and the physical space (that is, the ahead/behind relationship between the virtual object and the real object) can be correctly represented (the term "transparent" used herein means that it is invisible to the observer and thus, the portion of the virtual object that is hidden by this transparent CG is not drawn). Subsequently, based on the observer's viewpoint position provided by the viewpoint position detector 101 and the observer's viewpoint orientation provided by the viewpoint orientation detector 102, the observer's viewpoint is set within the virtual space and the virtual space image is generated as seen from the viewpoint (at the point of time, that image is not drawn because the display adjustment has not been completed).

The physical image capturer 105 has one or two image capture equipment such as cameras and it captures an image of the physical space which the observer sees via a camera interface (such as a video input interface, USB, IEEE1394 or the like) provided in the PC 14 when the display setting adjustor 106 and the image mixer 107 are implemented in the PC 14 as shown in FIG. 2.

The display setting adjustor 106 is implemented by a general-purpose microprocessor running the program therefor or in dedicated hardware in a similar manner to the virtual image synthesizer 104. Of course, only some processes of the display setting adjustor 106 may be implemented in dedicated hardware and the other processes may be implemented in software. The display setting adjustor 106 analyzes the tone of the physical image captured by the physical image capturer 105 and adjusts the drawing settings (drawing parameters) for the virtual information provided by the virtual image synthesizer 104 based on the analysis results. The operation of the display setting adjustor 106 will be described later in detail.

The image mixer 107 is also implemented by a general-purpose microprocessor running the program therefor or in dedicated hardware in a similar manner to the display setting adjustor 106. Of course, only some processes of the image mixer 107 may be implemented in dedicated hardware and the other processes may be implemented in software.

The image mixer 107 draws the virtual space image generated by the virtual image synthesizer 104 based on the drawing settings adjusted by the display setting adjustor 106. When the image display unit 108 is of video see-through type, the image mixer 107 combines the physical image captured by the physical image capturer 105 and the virtual space image and provides an output in the background of the virtual space image to be drawn.

On the contrary, when the image display unit 108 is of optical see-through type, the portion to be captured as the physical image when the image display unit 108 is of video see-through type is drawn in black and only the virtual space image is drawn and displayed on the image display unit 108 so that the observer can visually identify it through the image display unit 108.

The image display unit 108 is composed of image display equipment such as an HMD or computer display, which can display images to the observer. Superimposing a virtual image on a physical image can be accomplished by either of video see-through and optical see-through techniques. With the video see-through technique, a physical image captured by the physical image capturer 105 and a drawn virtual space image are combined into a single image to be displayed on the image display unit 108. With the optical see-through technique, the image display unit 108 projects a virtual space image onto a half mirror through a free-form-surface prism or other means so that the observer can visually identify it through the image display unit 108 and thus, the physical space and the virtual space image drawn by the image mixer 107 can be superimposed on the observer's retinae.

(Overall Operation)

Figure 3:
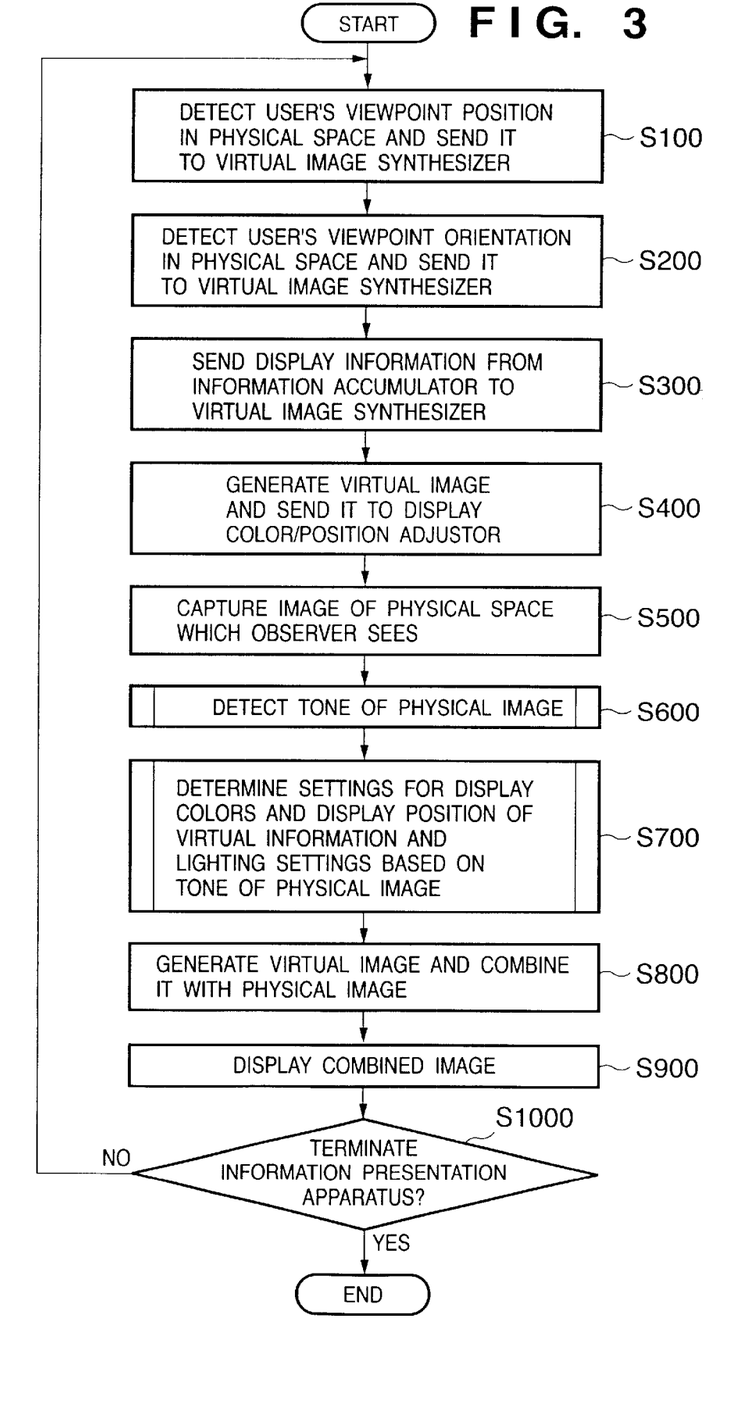
FIG. 3 is a flow chart for explaining an overall operation of the mixed reality presentation apparatus according to the embodiment of the present invention.

Now, the overall operation of the mixed reality presentation apparatus 100 will be described below with reference to the flow chart shown in FIG. 3. The process shown in FIG. 3 starts when the mixed reality presentation apparatus 100 is started.

First, at step S100, the viewpoint position detector 101 detects an observer's viewpoint position and sends it to the virtual image synthesizer 104.

At step S200, the viewpoint orientation detector 102 detects the observer's viewpoint orientation and sends it to the virtual image synthesizer 104. It should be appreciated that step S100 and step S200 are shown in time sequence in the figure but step S100 and step S200 may be performed simultaneously if the viewpoint position detector 101 and the viewpoint orientation detector 102 are provided separately as shown in FIG. 1 and they can operate in parallel.

At step S300, the virtual image synthesizer 104 reads out virtual information, real information, and image information from the corresponding information accumulator 103 based on the received viewpoint position information and viewpoint orientation.

At step S400, the virtual image synthesizer 104 constructs a virtual space to be superimposed on the physical space based on the virtual information and the real information, and generates a virtual space image to be presented to the observer based on the viewpoint position, the viewpoint orientation, and the image information. As described above, the virtual space image generated at the point of time is an undrawn virtual space image, which is equivalent to generating a three-dimensional virtual object with no lighting settings, generating a three-dimensional wire frame with no color settings, or determining display contents and interim display position for virtual text information as described later.

At step S500, the physical image capturer 105 captures an image of the physical space.

At step S600, the display setting adjustor 106 calculates the tone of the physical image captured by the physical image capturer 105.

At step S700, the display setting adjustor 106 determines the settings for display colors and display position of the virtual object and the settings for lighting (light source) used to draw the virtual object (such as position and angle) based on the tone of the physical image.

At step S800, the image mixer 107 draws the virtual object according to the settings determined by the display setting adjustor 106 and generates a virtual space image composed of the virtual object image. It also combines that image with the physical space image when the image display unit 108 is of video see-through type as described above. On the contrary, the portion of the image combined by the video see-through technique that is captured as the physical space image is drawn in black when the image display unit 108 is of optical see-through type.

At step S900, the image drawn (and combined) by the image mixer 107 is displayed on the image display unit 108.

At step S1000, the process will end if an instruction to terminate the operation of the mixed reality presentation apparatus 100 is issued and otherwise, the process returns to step S100 and repeats the operations described above. The termination of the operation can be instructed, for example, by the observer pressing down a predetermined button. Similarly, the operation may be terminated when the battery voltage drops below a predetermined value.

Tone Detection and Adjustment for Virtual Text Information

Next, the process of steps S600 and S700 in FIG. 3 wherein the display setting adjustor 106 calculates the tone of the physical image and determines the settings for display colors of the virtual object and display colors and/or display position of text information will be described below with reference to the flow chart in FIG. 4.

It should be appreciated that, for example, when a building name is superimposed on the physical space in the premise guide system as described above, the building name to be displayed is a virtual object to be displayed in a virtual space and at the same time, the building name is text information, that is, it has a nature different from that of a three-dimensional virtual object such as a virtual desk or chair. Therefore, in the following description, text information to be displayed in a virtual space will be referred to as "virtual text information" to be distinguished from a three-dimensional virtual object.

According to this embodiment, the tone detection and adjustment operation for virtual text information is accomplished with or without tone change and thus, the operation with tone change will be described first.

At step S610, the display setting adjustor 106 detects the tone of each pixel in the physical space image captured by the physical image capturer 105. It should be appreciated that the tone is represented with, for example, a data set of (R, G, B, α) in the following description but the tone may be represented in any other form.

At step S710, the display setting adjustor 106 checks the virtual image generated by the virtual image synthesizer 104 against the physical image captured by the physical image capturer 105 to calculate the average tone of the background for virtual text information to be displayed at the interim display position determined at step S400, that is, the average tone of the boundary box region surrounding the text information. According to this embodiment, the boundary box region can be in any shape and may be a minimum rectangular surrounding the text information.

At step S720, the display setting adjustor 106 determines a tone with some difference from the average tone of the boundary box region calculated at step S710. The tone difference may be determined to any extent and in any manner and it should be easiest to predetermine a tone which is more visible than the average tone through calculation or manual verification and store it in a lookup table or to calculate it through a mathematical expression for each detecting operation.

The lookup table is a correspondence table to find out, for example, a tone (R', G', B', $\alpha'$) with some tone difference when another tone (R, G, B, $\alpha$) is entered. The mathematical expression may be, for example, a determinant such as X(R, G, B, $\alpha$)=(R', G', B', $\alpha'$).

Specifically, when each pixel is to be displayed in 256-level R, G, and B. the complementary color to the original tone (R, G, B) can be obtained as (R', G', B') by assuming that R'=255-R, G'=255-G, and B'=255-B.

At step S730, the display setting adjustor 106 determines the settings used to draw virtual text information with the tone calculated at step S720.

Next, the operation without tone change will be described below with reference to the flow chart shown in FIG. 5. In FIG. 5, similar operations have the same step numbers to those described for FIG. 4 and will not be described here.

Whether a tone change is made or not can be optionally selected during the initialization of the apparatus. If no tone change is made, the display tone can be predetermined separately for each piece of virtual text information, or collectively for all virtual text information, or depending on the display contents. For example, when the apparatus according to this embodiment is used to guide a shopping mall, the observer can easily find out a desired shop from the color of text information if virtual text information is displayed with different colors for shop types.

Figure 4:
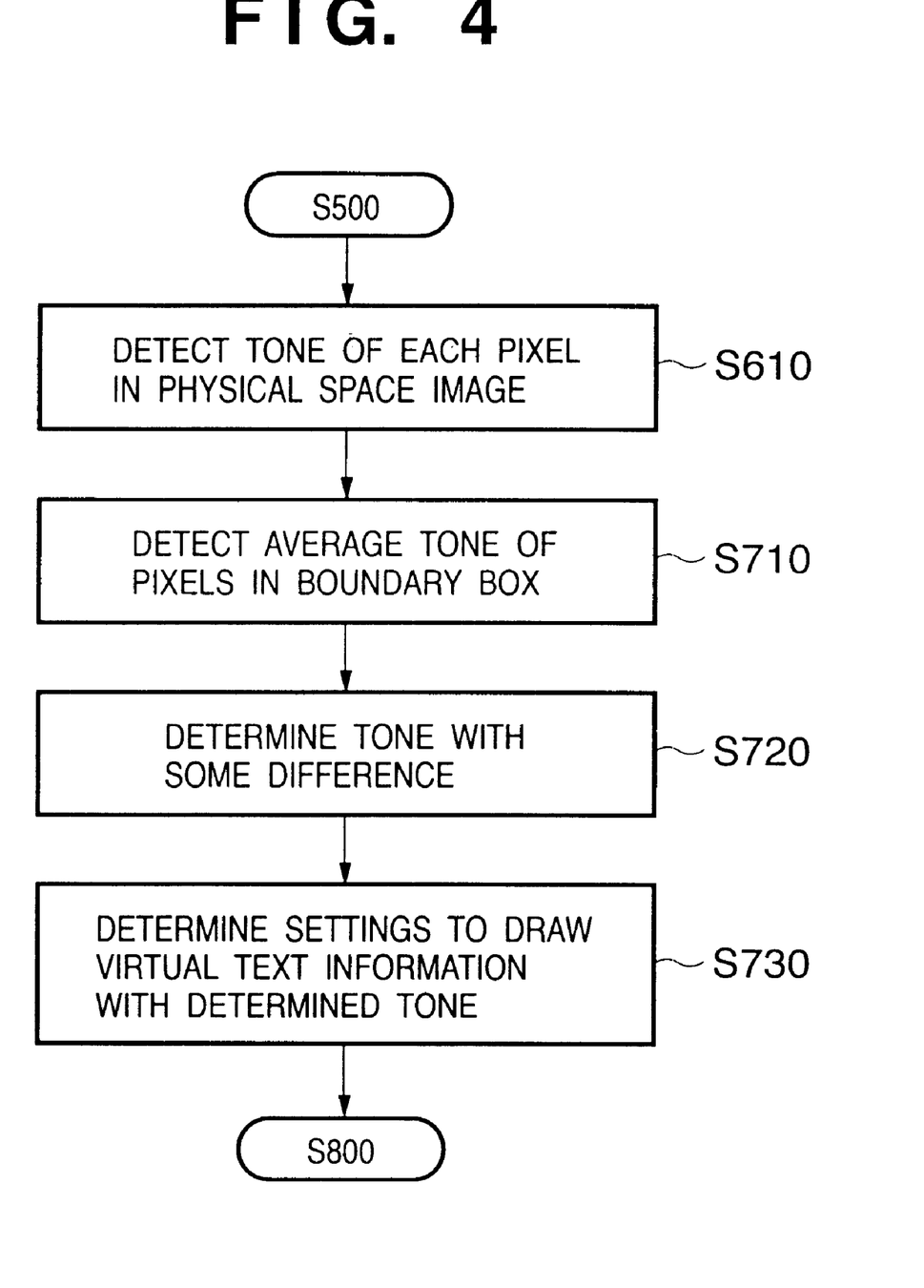
FIG. 4 is a flow chart for explaining a tone detection and adjustment process for virtual text information when a tone is to be changed in the embodiment of the present invention.
Figure 5:
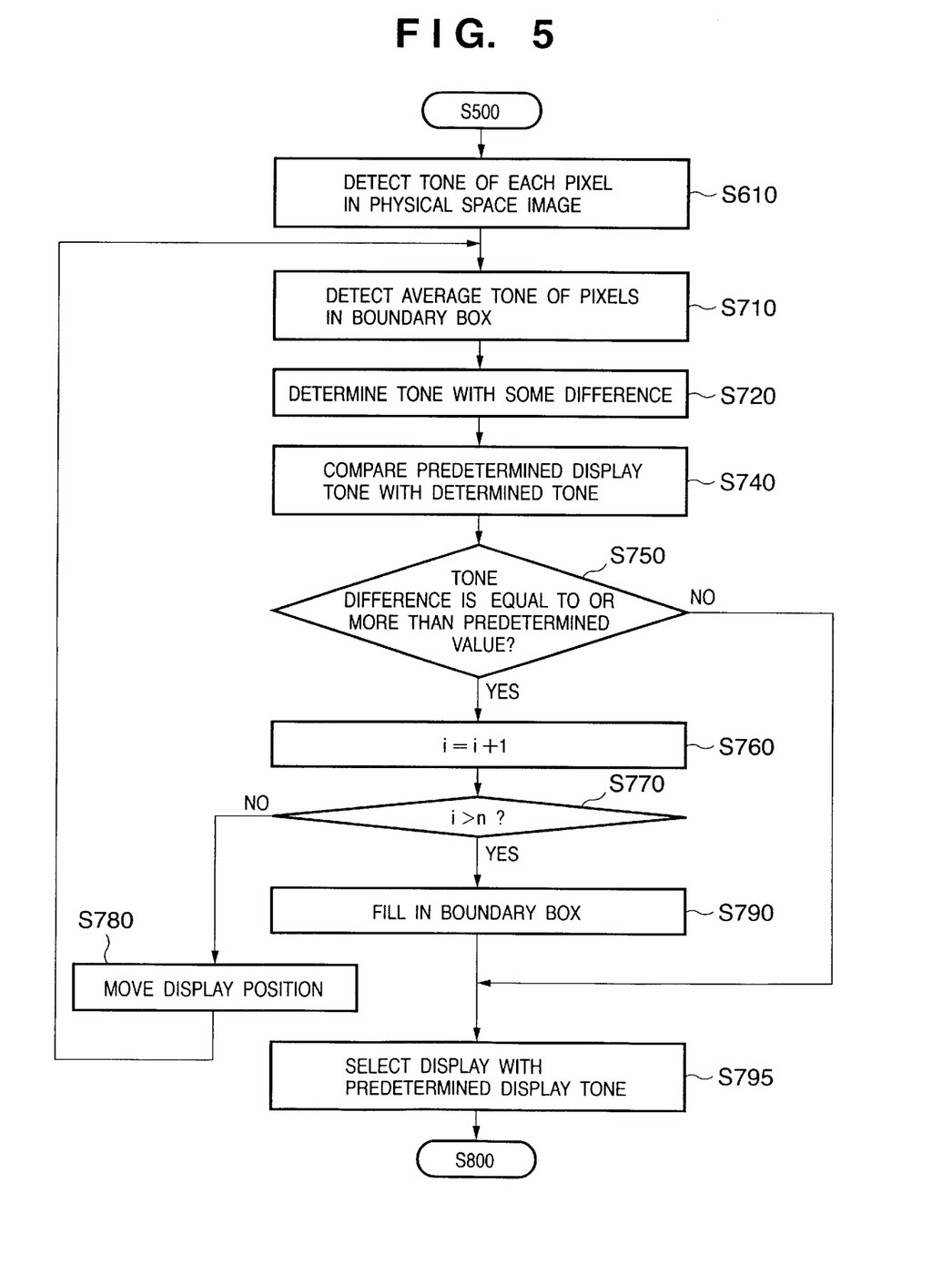
FIG. 5 is a flow chart for explaining the tone detection and adjustment process for virtual text information when the tone is not to be changed in the embodiment of the present invention.

In FIG. 5, the operations at steps S610 through S720 are identical to those shown in FIG. 4. However, without any tone change setting, even if a tone with some difference from the average tone of the boundary box region is determined at step S720, nothing is displayed with the determined tone and the determined tone is compared with the display tone predetermined for the virtual text (step S740). It should be appreciated that this comparison may be accomplished by calculating a square-sum of differences between tone components.

As a result of the comparison, it is determined whether a difference between the predetermined display tone and the desirable display tone determined at step S720 is equal to or more than a predetermined value (step S750) and if so, the process proceeds to step S760.

On the contrary, if the difference between the predetermined display tone and the desirable display tone determined at step S720 is less than a predetermined value, the process proceeds to step S795 wherein a display with the predetermined display tone is selected and then proceeds to step S800.

If it is determined at step S750 that the tone difference is equal to or more than a predetermined value, the physical space image (or the physical space) within the boundary box region may be displayed with an insufficient tone difference and thus insufficient visibility when the predetermined display tone is used for display. Therefore, it is determined whether the visibility can be improved by moving the display position of the virtual text information.

Namely, the variable i used to count the number of moving operations is incremented by one at step S760 and the display position will be moved if the variable i is equal to or less than a predetermined number n (steps S770, S780). For this purpose, the display position may be moved in random directions, or in a predetermined direction, or according to a predetermined algorithm.

As an example where the direction is determined according to a predetermined algorithm, the tone of each pixel in the boundary box is detected and then a direction from the center of the boundary box region to a pixel having the largest tone difference from the predetermined display tone is supposed to be a moving direction. The distance for each moving operation may be optionally selected but a large moving may cause some interference with the display of other virtual text information as well as make unclear the correspondence to the real object to be otherwise pointed to. On the contrary, a too small moving may produce very little effect and thus, the moving distance should be determined in consideration of the size of the boundary box region.

The display position is moved at step S780 and the operations at steps S710 through S750 are repeated again. If the difference from the tone determined at step S720 is less than a predetermined value during the n number of moving operations, the process proceeds to step S795 wherein a display with the predetermined display tone is performed.

If the difference from the tone determined at step S720 is not less than a predetermined value after the n number of moving operations, the display position for virtual text information is returned to the initial position before the moving operations are performed and the process proceeds to step S795 after the background drawing is selected (step S790).

The background drawing is an operation to fill the boundary box region surrounding the virtual text information with a tone which has some difference from the display tone predetermined for the virtual text information to be displayed. The color used for this operation may be the complementary color to the predetermined display tone but it should be easiest to fill the region with a tone calculated at step S720.

(Tone Detection and Adjustment for Virtual Wire Frame Information)

The tone detection and adjustment operations for virtual text information have been described with reference to FIGS. 4 and 5 and the tone detection and adjustment operations for virtual wire frame information will be described next.

Virtual wire frame information is used to highlight a particular object (for example, a building) which exists in the physical space by superimposing and displaying the wire frame on the contour of that particular object. Such virtual wire frame information is different from virtual text information in that it is used to represent the contour of a three-dimensional object but it is wholly displayed with a single tone like virtual text information because of its nature as wire frame.

The process of steps S600 and S700 in FIG. 3 wherein the display setting adjustor 106 calculates the tone of the physical image and determines the settings for display colors of virtual wire frame information will be described below with reference to the flow chart in FIG. 6.

At step S620, the display setting adjustor 106 calculates the average value of the tone of pixels in the physical image captured by the physical image capturer 105 and supposes it to be the average tone of the whole image.

At step S751, the display setting adjustor 106 determines a tone with some difference from the average tone of the whole image calculated at step S620 in a similar manner to that at step S720 in FIG. 4.

At step S752, the display setting adjustor 106 selects the settings for drawing the wire frame with a tone calculated at step S751.

(Tone Detection and Adjustment for Virtual Three-dimensional Object)

Next, the tone detection and adjustment operations for a virtual three-dimensional object according to this embodiment will be described. Unlike the virtual text information and virtual wire frame information as described above, a virtual three-dimensional object has some planes. Therefore, the display colors of the object will vary from portion to portion depending on the direction, angle, and color of the light source used for rendering.

The process of steps S600 and S700 in FIG. 3 wherein the display setting adjustor 106 calculates the tone of the physical image and determines the settings for lighting used to illuminate a virtual three-dimensional object (CG object) will be described below with reference to the flow chart in FIG. 7.

At step S630, the display setting adjustor 106 calculates the average value of the tone of pixels in the physical image captured by the physical image capturer 105 and supposes it to be the average tone of the whole image.

Next, at step S781, the display setting adjustor 106 calculates a variable for light source settings from the average tone of the whole image calculated at step S630. The variable for light source settings is, for example, the value of (R, G, B) used to determine the tone of diffuse light, ambient light, and specular light. A mathematical expression to calculate the variable for light source settings may be, for example, a determinant such as Y(R, G, B)=(R', G', B') when supposing that the average tone of the whole image is (R, G, B) and that the variable for light source settings is (R', G', B'). After the variable for light source settings has been calculated, the light source settings are selected for drawing a virtual image based on the variable. The direction and angle of the light source can be also determined but the settings for lighting color used for rendering can remarkably reduce the degree of disharmony which the observer may feel.

Figure 6:
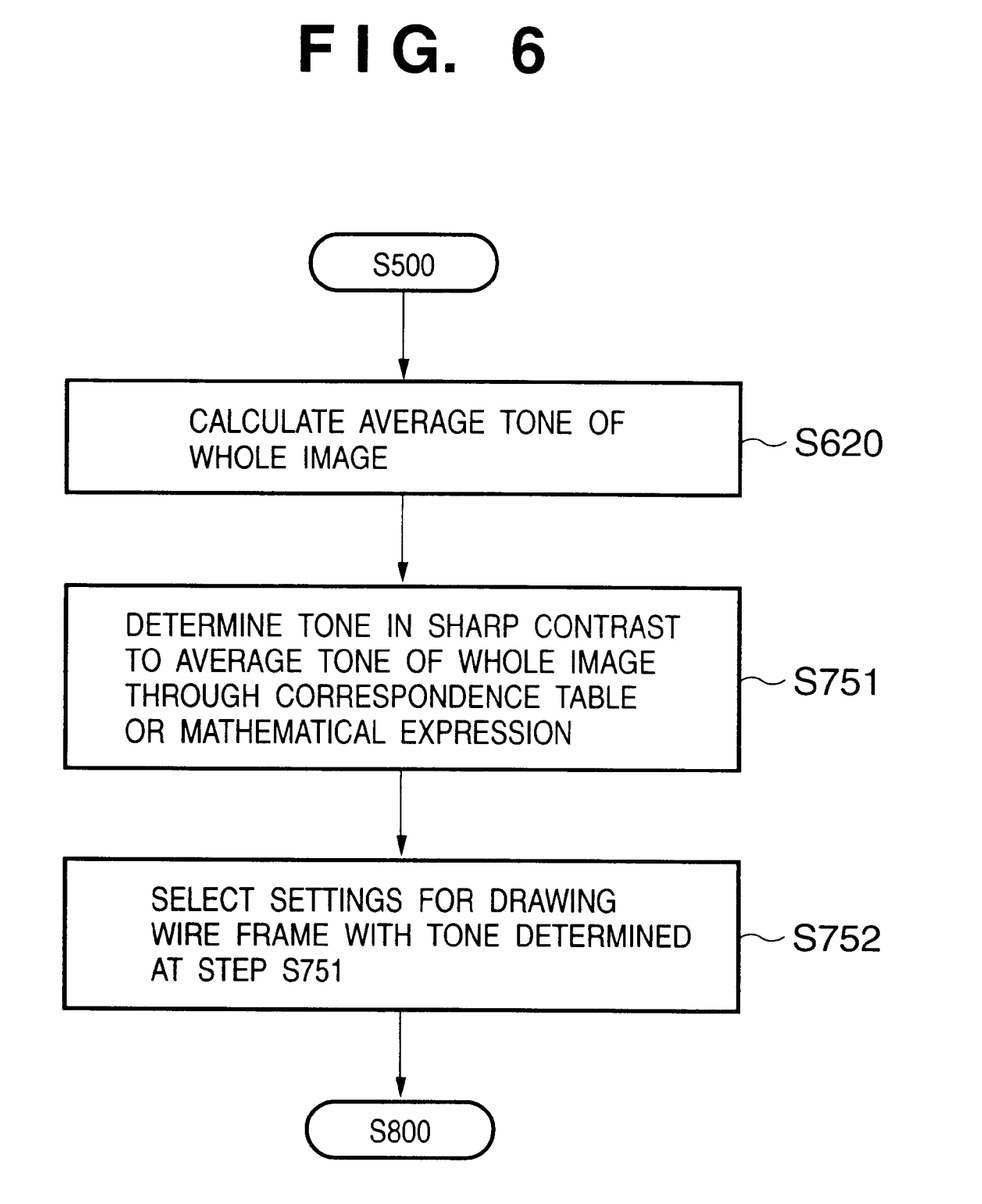
FIG. 6 is a flow chart for explaining the tone detection and adjustment process for virtual wire frame information in the embodiment of the present invention.
Figure 7:
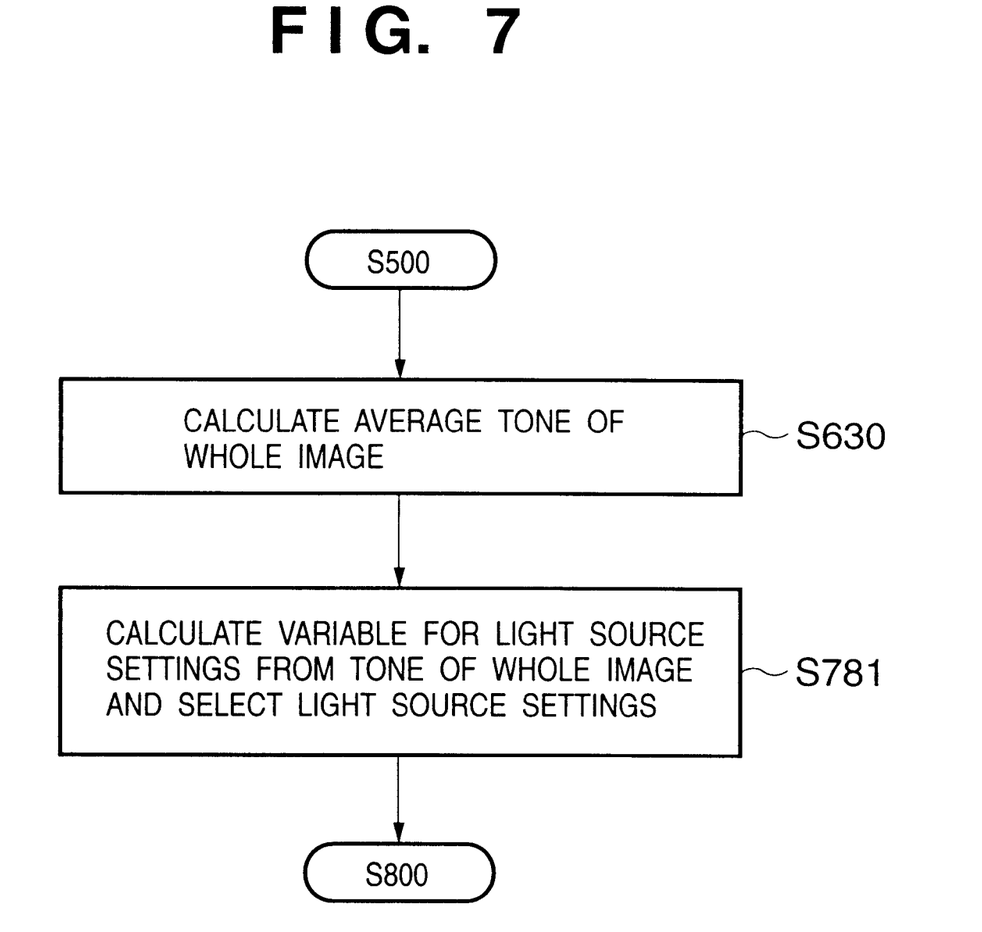
FIG. 7 is a flow chart for explaining an lighting setting process when a three-dimensional virtual object is to be drawn in the embodiment of the present invention.

It should be appreciated that the operations at steps S620 and S630 described for FIGS. 6 and 7 can be performed separately or simultaneously because they are identical.

Similarly, it should be also appreciated that the steps described for FIGS. 4 through 7 can be performed in sequence or in parallel.

Other Embodiments

It should be appreciated that the present invention may be applied to a system consisting of a plurality of apparatuses (for example, a host computer, interface devices, readers, and a printer or the like) or to a single apparatus configured by integrating these apparatuses (for example, a copier or a facsimile or the like).

It is needless to say that the objects of the present invention can be attained by providing a system or apparatus with a storage medium (or recording medium) which stores program codes of software to implement the functions of the above-mentioned embodiment and causing a computer (or a CPU or MPU) of the system or apparatus to read out and execute the program codes stored on the storage medium. In this case, the program codes read out from the storage medium will implement the functions of the above-mentioned embodiment and the storage medium storing the program codes will constitute the present invention. It is also needless to say that the present invention may include the case where the functions of the above-mentioned embodiment are implemented by executing the program codes read out by the computer as well as the case where, upon the instructions of the program codes, the operating system (OS) or the like running on the computer performs some or all of the actual operations to implement the functions of the above-mentioned embodiment.

It is further needless to say that the present invention may include the case where after the program codes read out from the storage medium have been written into a memory which is provided in an expansion card inserted into the computer or an expansion unit connected to the computer, upon the instructions of the program codes, a CPU provided in the expansion card or the expansion unit performs some or all of the actual operations to implement the functions of the above-mentioned embodiment.

When the present invention is applied to the above-mentioned storage medium, the storage medium will store the program codes equivalent to the flow charts (in one or more of FIGS. 3 through 7) described above.

From the foregoing, the present invention can allow for display of a virtual space superimposed on the physical space with constantly good visibility according to the change in the physical space, by using a tone determined depending on the tone of the background physical space.

In addition, the present invention call allow for presentation to the observer of an MR space where the physical space and a virtual space are highly merged, by determining the lighting tone to draw a virtual object so that it can be merged into the tone of the physical space.

Furthermore, the present invention can be applied to the system comprising either a plurality of units or a single unit. It is needless to say that the present invention can be applied to the case which can be attained by supplying programs which execute the process defined by the present system or invention.

What is claimed is:

1. A mixed reality presentation apparatus for presenting a mixed reality to an observer by superimposing a virtual space image including a virtual object image on a real space image visually identified by the observer and presenting the virtual space image to the observer, comprising:

real space image capturing means for capturing a real space image;

detecting means for detecting viewpoint information of said observer;

virtual image generating means for generating a virtual space image based on the viewpoint information; and superimposing means for superimposing the virtual space image on the real space image, wherein said virtual image generating means includes:

region determination means for determining a boundary box region that surrounds virtual text information generated as the virtual space image;

tone detection means for detecting an average tone within the boundary box region in the real space image;

calculating means for calculating the complementary color of the average tone as a calculated tone; and drawing means for drawing the virtual text information using the calculated tone.

2. The mixed reality presentation apparatus according to claim 1, wherein said region determination means determines a minimum rectangle surrounding the text information as the boundary box region.

3. A mixed reality presentation apparatus for presenting a mixed reality to an observer by superimposing a virtual space image including a virtual object image on a real space image visually identified by said observer and presenting the virtual space image to the observer, comprising:

real space image capturing means for capturing a real space image;

detecting means for detecting viewpoint information of said observer;

virtual image generating means for generating a virtual space image based on the viewpoint information; and superimposing means for superimposing the virtual space image on the real space image, wherein said virtual image generating means includes;

region determination means for determining a boundary box region that surrounds virtual text information generated as the virtual space image;

tone detection means for detecting a tone within the boundary box region in the real space image;

calculating means for calculating a calculated tone having some difference from the tone of the boundary box region; and drawing means for drawing the virtual text information using the calculated tone, and wherein said apparatus further comprises setting means for setting whether the calculated tone is to be used for drawing the virtual text information or not in an initialization setting of said apparatus.

4. A mixed reality presentation apparatus for presenting a mixed reality to an observer by superimposing a virtual space image including a virtual object image on a real space image visually identified by the observer and presenting the virtual space image to the observer, comprising:

real space image capturing means for capturing a real space image;

detecting means for detecting viewpoint information of the observer;

virtual image generating means for generating a virtual space image based on the viewpoint information, wherein said virtual image generating means includes tone detection means for detecting a tone within a predetermined region in the real space image and tone determination means for determining a tone of the virtual space image based on the detected tone;

superimposing means for superimposing the virtual space image on the real space image; and display location changing means for changing the display location of the virtual object image when the difference between a predetermined tone for the virtual object image and the tone determined by said tone determination means is more than a predetermined value, and for supplying the predetermined tone as the determination result from said tone determination means to said virtual space image generation means if the difference between the tone determined by said tone determination means and the predetermined tone is equal to or less than the predetermined value at the changed display location.

5. The mixed reality presentation apparatus according to claim 4, wherein said display location changing means supplies the predetermined tone as the determination result from said tone determination means to said virtual space image generation means and instructs said virtual space image generation means to fill in the background of the virtual object image with the tone determined by said tone determination means, when the difference between the tones is more than the predetermined value after a predetermined number of display location changes.

6. A control method of a mixed reality presentation apparatus for presenting a mixed reality to an observer by superimposing a virtual space image including a virtual object image on a real space image visually identified by the observer and presenting the virtual space image to the observer, comprising:

a real space image capturing step of capturing a real space image;

a detecting step of detecting viewpoint information of the observer;

a virtual image generating step of generating a virtual space image based on the viewpoint information; and a superimposing step of superimposing the virtual space image on the real space image, wherein said virtual image generating step includes:

a region determination step of determining a boundary box region that surrounds virtual text information generated as the virtual space image;

a tone detection step of detecting an average tone within the boundary box region in the real space image;

a calculating step of calculating the complementary color of the average tone as a calculated tone; and a drawing step of drawing the virtual text information using the calculated tone.

7. A control method of a mixed reality presentation apparatus for presenting a mixed reality to an observer by superimposing a virtual space image including a virtual object image on a real space image visually identified by the observer and presenting the virtual space image to the observer, comprising:

a real space image capturing step of capturing a real space image;

a detecting step of detecting viewpoint information of the observer;

a virtual image generating step of generating a virtual space image based on the viewpoint information, wherein said virtual image generating step includes a tone detection step of detecting a tone within a predetermined region in the real space image and a tone determination step of determining a tone of the virtual space image based on the detected tone;

a superimposing step of superimposing the virtual space image on the real space image; and a display location changing step of changing the display location of the virtual object image when the difference between a predetermined tone for the virtual object image and the tone determined by said tone determination step is more than a predetermined value, and for supplying the predetermined tone as the determination result from said tone determination step to said virtual space image generation step if the difference between the tone determined by said tone determination step and the predetermined tone is equal to or less than the predetermined value at the changed display location.

8. A computer-readable storage medium storing a control program of a mixed reality presentation apparatus for presenting a mixed reality to an observer by superimposing a virtual space image including a virtual object image on a real space image visually identified by the observer and presenting the virtual space image to the observer, said program comprising:

- a real space image capturing process program for capturing a real space image;
- a detecting process program for detecting viewpoint information of the observer;
- a virtual image generating process program for generating a virtual space image based on the viewpoint information; and
- a superimposing process program for superimposing the virtual space image on the real space image,
- wherein said virtual image generating process program includes:
  - a region determination process program for determining a boundary box region that surrounds virtual text information generated as the virtual space image;
  - a tone detection process program for detecting an average tone within the boundary box region in the real space image;
  - a calculating process program for calculating the complementary color of the average tone as a calculated tone; and
  - a drawing process program for drawing the virtual text information using the calculated tone.

9. A computer-readable storage medium storing a control program of a mixed reality presentation apparatus for presenting a mixed reality to an observer by superimposing a virtual space image including a virtual object image on a real space image visually identified by the observer and presenting the virtual space image to the observer, said program comprising:

- a real space image capturing process program for capturing a real space image;
- a detecting process program for detecting viewpoint information of the observer;
- a virtual image generating process program for generating a virtual space image based on the viewpoint information wherein said virtual image generating process program includes a tone detection process program for detecting a tone within a predetermined region in the real space image and a tone determination process program for determining a tone of the virtual space image based on the detected tone;
- a superimposing process program for superimposing the virtual space image on the real space image; and
- a display location changing process program for changing the display location of the virtual object image when the difference between a predetermined tone for the virtual object image and the tone determined by the tone determination process program is more than a predetermined value and for supplying said predetermined tone as the determination result from said tone determination process program to said virtual space image generation process program if the difference between the tone determined by said tone determination process program and the predetermined tone is equal to or less than the predetermined value at the changed display location.

10. A control method of a mixed reality presentation apparatus for presenting a mixed reality to an observer by superimposing a virtual space image including a virtual object image on a real space image visually identified by the observer and presenting the virtual space image to said observer, comprising:

- a real space image capturing step of capturing a real space image;
- a detecting step of detecting viewpoint information of said observer;
- a virtual image generating step of generating a virtual space image based on the viewpoint information; and
- a superimposing step of superimposing the virtual space image on the real space image,
- wherein said virtual image generating step includes;
  - a region determination step of determining a boundary box region that surrounds virtual text information generated as the virtual space image;
  - a tone detection step of detecting a tone within the boundary box region in the real space image;
  - a calculating step of calculating a calculated tone having some difference from the tone of the boundary box region; and
  - a drawing step of drawing the virtual text information using the calculated tone, and
- wherein said control method further comprising a setting step of setting whether the calculated tone is to be used for drawing the virtual text information or not in an initialization setting of said apparatus.

11. A computer-readable storage medium storing a control program of a mixed reality presentation apparatus for presenting a mixed reality to an observer by superimposing a virtual space image including a virtual object image on a real space image visually identified by the observer and presenting the virtual space image to the observer, said program comprising:

- a real space image capturing process program for capturing a real space image;
- a detecting process program for detecting viewpoint information of the observer;
- a virtual image generating process program for generating a virtual space image on the real space image,
- wherein said virtual image generating process program includes:
  - a region determination process program for determining a boundary box region that surrounds virtual text information generated as the virtual space image;
  - a tone detection process program for detecting a tone within the boundary box region in the real space image;
  - a calculating process program for calculating a calculated tone with some difference from the tone of the boundary box region; and
  - a drawing process program for drawing the virtual text information using the calculated tone, and
  - wherein said program further comprising a setting process program for setting whether the calculated tone is to be used for drawing the virtual text information or not in an initialization setting of said apparatus.

* * * * *

UNITED STATES PATENT AND TRADEMARK OFFICE
CERTIFICATE OF CORRECTION

PATENT NO. : 6,633,304 B2
DATED : October 14, 2003
INVENTOR(S) : Anabuki et al.

It is certified that error appears in the above-identified patent and that said Letters Patent is hereby corrected as shown below:

Column 1,
Line 29, "Researches have" should read -- Research has --; and
Line 42, "a" (second occurrence) should read -- an --.

Column 9,
Line 24, "B." should read -- B, --.

Column 10,
Lines 20 and 23, "moving" should read -- movement --.

Column 11,
Line 36, "diffuse" should read -- diffused --.

Column 13,
Line 19, "includes;" should read -- includes: --.

Column 16,
Line 14, "includes;" should read -- includes: --.

Signed and Sealed this

Thirteenth Day of July, 2004

JON W. DUDAS
*Acting Director of the United States Patent and Trademark Office*